Aug. 28, 1928.    L. S. CHADWICK ET AL    1,682,701
LIQUID FUEL STOVE
Filed Nov. 19, 1926    8 Sheets-Sheet 1

Inventors
Lee S. Chadwick
and Marc Resek
By Hull, Brock & West
Attys.

Aug. 28, 1928.

L. S. CHADWICK ET AL

1,682,701

LIQUID FUEL STOVE

Filed Nov. 19, 1926

L. S. CHADWICK ET AL 1,682,701

LIQUID FUEL STOVE

Filed Nov. 19, 1926

Inventors
Lee S. Chadwick
and Marc Resek
By Hull, Brock & West
Attys.

Patented Aug. 28, 1928.

1,682,701

UNITED STATES PATENT OFFICE.

LEE S. CHADWICK, OF SHAKER HEIGHTS, AND MARC RESEK, OF CLEVELAND HEIGHTS, OHIO, ASSIGNORS TO PERFECTION STOVE COMPANY, OF CLEVELAND, OHIO, A CORPORATION OF OHIO.

LIQUID-FUEL STOVE.

Application filed November 19, 1926. Serial No. 149,353.

This invention relates to improvements in liquid fuel stoves of the same class as that embracing the invention which constitutes the subject matter of our co-pending application, Serial No. 126,366, filed August 2, 1926.

The general purpose of the invention in this as in the former case is to provide a removable fuel tank or reservoir for liquid fuel stoves, particularly of the retort class wherein the lighter hydrocarbons are used as fuel and wherein the fuel is fed by air pressure.

By making the tank or reservoir removable, in contra-distinction to the prior art stoves of this class wherein the fuel containers are permanently connected to the stoves, the fire hazard attending the replenishing of the fuel supply is eliminated because of the fact that the tanks or reservoirs may be carrier away from the stove and filled at some remote place. Furthermore the removable tank or reservoir permits of the use of two or more reservoirs with each stove so that one or more of the reservoirs may be kept filled at all times and the replenishing of the fuel supply involves only the removal of an empty reservoir and the substitution therefor of a full one.

Further and more specific objects of the invention are to provide efficient, fluid-tight, quick detachable connections for joining the tank or reservoir to the fuel conduit of the stove and which are of such nature as will facilitate the application and removal of the tank.

Further objects will appear as we proceed to describe the invention in detail by reference to the accompanying drawings wherein.

The construction of the stove frame may follow approved practice, the frame comprising a top 1, legs 2, end panels 3 and 4, and a shelf 5. The top 1 is provided with the usual burner openings 6 that are fitted with grids 7.

Secured, as by fastening means 10, to the end panel 3 is a unit 11 in the nature of a substantial casting which has horizontally disposed branches 12 and 13 that are spaced apart a suitable distance in a vertical direction. The branch 13 terminates in a hollow boss 14 which is tapered at its upper end to constitute a seat 15, and it has a port 16 that is adapted to be closed by a valve 17, acting under the influence of a spring 18. The spring surrounds the stem of the valve and is compressed between the valve body and a follower 19 that is threaded into the lower end of the boss 14, the boss being sealed after the insertion of the valve, spring and follower, by a plug 20 that may be equipped with a packing washer in accordance with common practice.

Connected with the upper end of the unit 11 is a pipe 25 which communicates, through a passageway 26, with the interior of the boss 14. At its upper end the pipe 25 is connected to a fitting 28 that is secured by fastening means 29 to the end panel 3, said fitting being in the nature of an L involving a horizontal branch 29 which extends toward the front of the stove. A stud 30 rises from the horizontal branch of the fitting 28 and the same is surrounded by an annular depressed seat 31 to which is adapted to be removably secured, as by clamp 33, the depending boss 34 of the lateral branch 35 of a retort or vaporizer 36.

Communication is established between the pipe 25 and the retort or vaporizer 36 through a bore 37 of the fitting and a port 38 in the stud 30. The bore 37 is enlarged forwardly of a point to the rear of the port 38 and is tapped for the reception of the threaded stem 39 of a needle valve 40 which cooperates with a seat formed between the larger and smaller portions of the bore 37. A packing gland 41 seals the joint between the valve stem 39 and the branch 29, and at its forward end the valve stem is equipped with a handle 42.

The retort or vaporizer 36 is of the well-known tubular type and the same includes a needle valve 46 (Fig. 5) that is located adjacent the inner end of the retort and is controlled through its stem 47 by a hand wheel 48 that is applied to the outer end of said stem. The retort or vaporizer is projected through an opening in the end panel 3 substantially centrally of the adjacent opening 6 in the stove top. A packing gland 49 seals the joint between the valve stem 47 and the outer end of the vaporizer.

Figure 5:
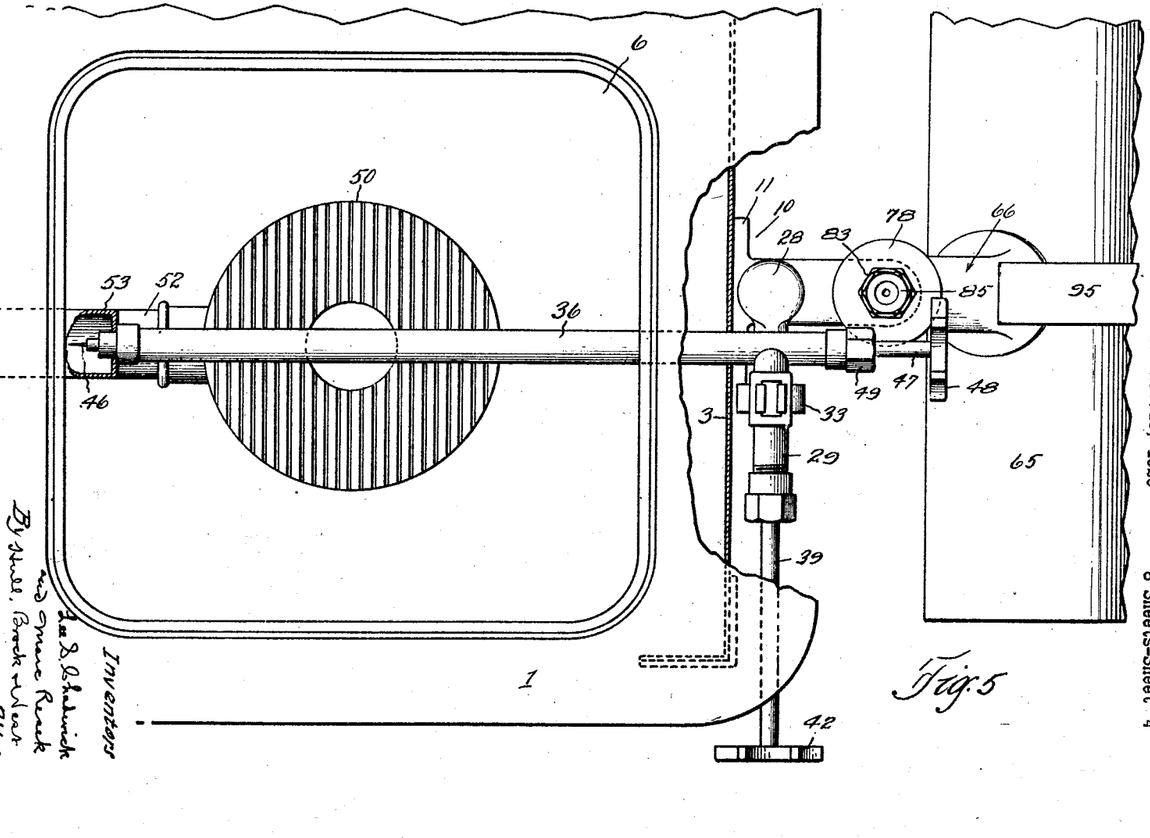
Fig. 5 is a fragmentary plan view of the stove.

Situated centrally of and beneath the openings 6 of the stove top are burners 50 and 51 that are supported by and communicate with a fuel supply pipe 52. Rising from the pipe 52, intermediate its connections with the burners 50 and 51, is an elbow 53 into the end of which the reduced end of the retort or vaporizer 36 projects, the end of the elbow being closed, as shown in Fig. 5. An air intake branch 54 depends from the horizontal part of the elbow 53. Thus the elbow forms a mixing chamber for the vapor which issues from the retort 36 and the air which is drawn in through the branch 54, the mixture passing on through the pipe 52 to the burners. As will presently appear, the gas supplied to the burner 50 is controlled by the valves 41 of the retort, while the gas supply to the burner 51 is governed by a valve 56 of usual type that is adapted to be adjusted toward and from its seat by a lever 57 that is connected to the outer end of the valve stem 58 and is pivoted to a bracket 59, carried by an extension of the valve casing. The assembly comprised of the burners, fuel pipe and elbow 53 is suitably supported from the stove structure, as by a strap 60 that depends from the stove top and a member 61 that is carried by the end panel 4.

A fuel reservoir 65, shown in the form of a cylindrical tank, is removably connected to the unit 11. Applied to the reservoir 65 is a spout like member 66 that terminates in a vertically disposed boss 66$^a$ that is enlarged at its upper end and through which a filling opening 67 extends. The upper end of the filling opening is in axial alignment with an outlet opening 68 that is formed in the lower end of the boss 66$^a$, and below the outlet opening the boss is designed to accurately fit the seat 15 of the previously mentioned boss 14. The outlet opening 68 is controlled by a valve 70 that is urged toward closed position by a spring 71 that surrounds the stem of the valve and is compressed between the valve body and a follower 72 that is suitably supported within the member 60 as by being screwed downwardly into the reduced portion of the boss 66$^a$. A tube 75, which leads from near the bottom of the reservoir 65, has its upper end secured to the fitting 66 and communicates with the outlet opening 68 through a port 76.

A screw cap 78, applied to the upper end of the member 66, closes the filling opening, a suitable packing washer being employed to seal the joint. The cap has a central aperture 79 that is surrounded by a tapered seat 80 wherewith cooperates the correspondingly shaped lower end of a hollow screw 81 that is threaded through the upper horizontal branch 12 of the unit 11. By means of this screw, the reservoir is sustained in place with the member 66 clamped between said screw and the boss 14 of the lower branch of the unit 11. A hollow plug 83 is threaded into the upper end of the screw 81 and communication between its bore and the bore of the screw 81 is controlled by a ball check valve 84 of ordinary type. The bore of the plug 83 is enlarged and internally threaded at its upper end and intermediate the different size portions of said bore is a tapered seat wherewith the tapered end of a screw valve 85 cooperates, said screw valve having a port 86 which opens at its lower end through the tapered wall of said valve whereby, when the valve is screwed down onto its seat, said port is closed. The screw valve 85 is shown as having a depression 88 at its upper end for the application of an air pump 90 that is shown in dotted lines in Fig. 4.

While the springs 18 and 71 serve to close their respective valves 17 and 70 when the reservoir 65 is removed from the stove, the valve 70 is unseated in opposition to its spring when the reservoir is applied to the stove by the engagement of protuberances 91, on said valve, with the upper end of the boss 14. The valve 17 in turn is unseated by the engagement of a protuberance 92 thereof with the valve 70, the pressure of the spring 71 being superior to that of the spring 18 to the attainment of this end.

Attention is called to the fact that the receiving end of the fuel conduit which leads to the burners is constituted of the port 16 in the upper end of the boss 14.

Figure 1:
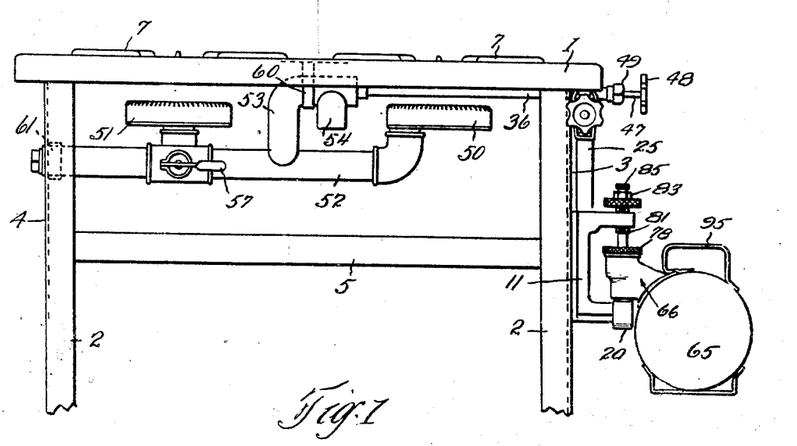
Fig. 1 is a partial front elevation, and Fig. 2 a plan view, of a stove incorporating our improvements.
Figure 2:
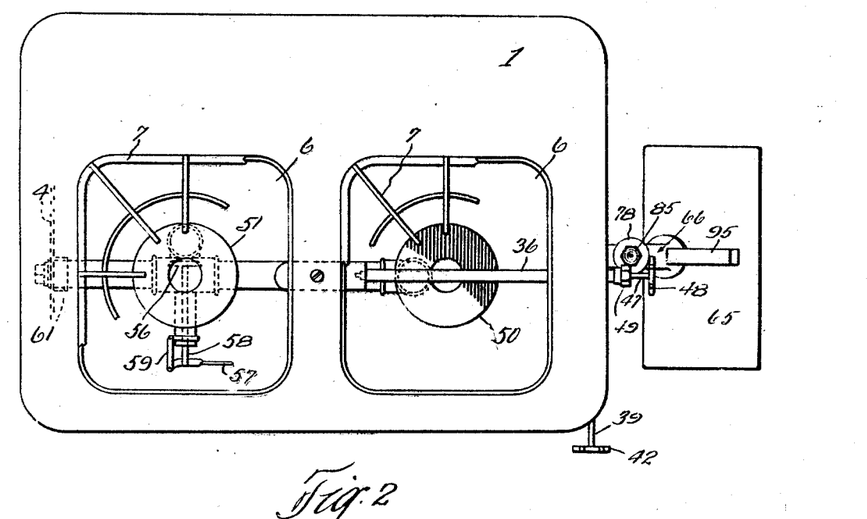
Figure 3:
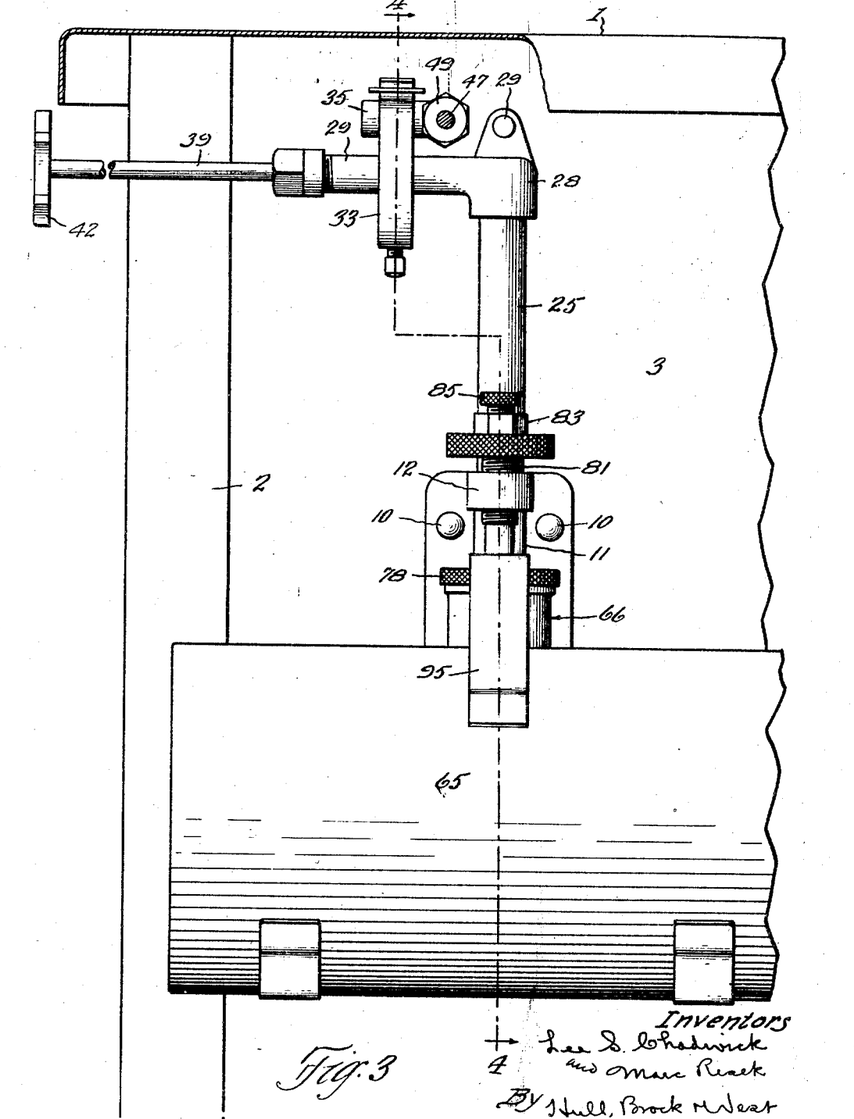
Fig. 3 is a fragmentary enlarged right hand end elevation of the stove.
Figures 4, 6:
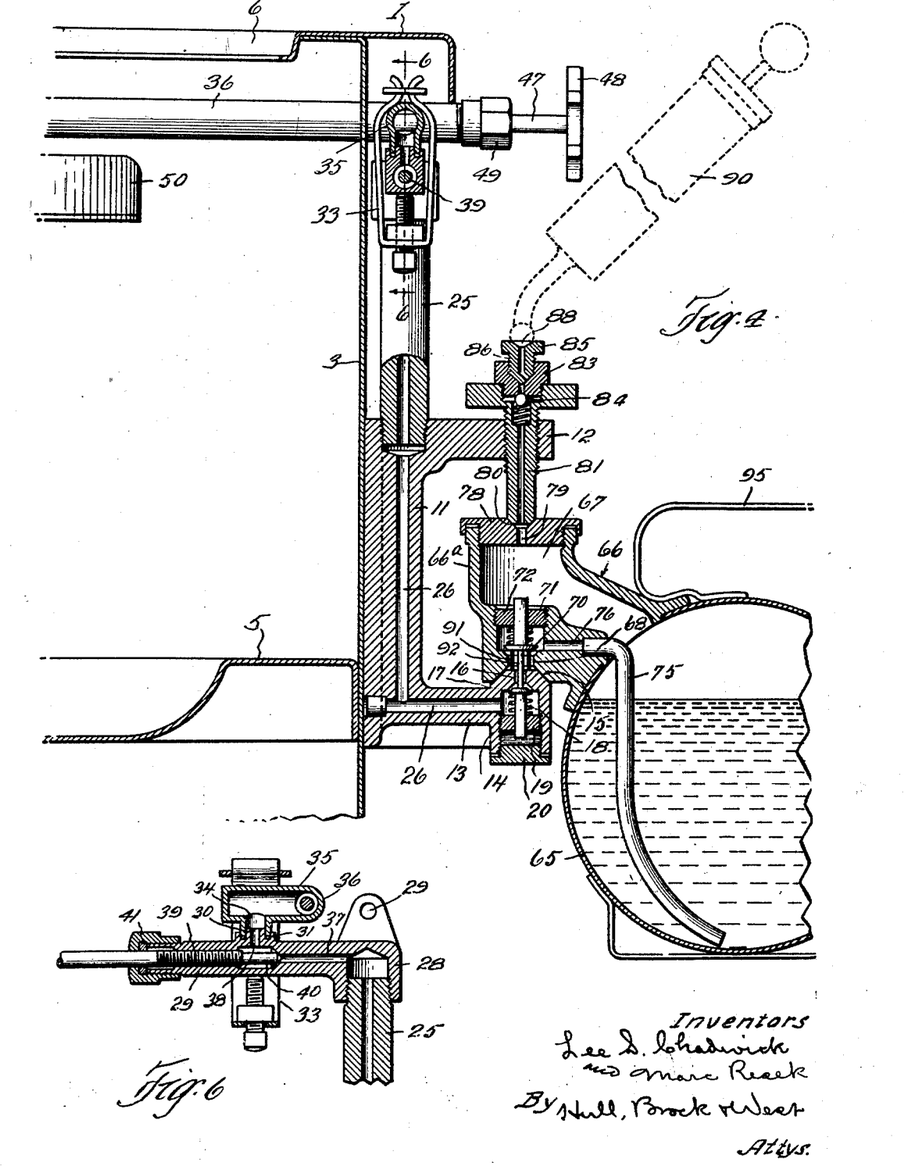
Fig. 4 is a vertical section on the line 4—4 of Fig. 3.
Fig. 6 (Sheet 3) is a sectional detail on the line 6—6 of Fig. 4.

With the reservoir connected to the stove in the manner shown and described, air may be introduced into the reservoir by retracting the screw valve 85 and applying to the port thereof the pump 90, as indicated by dotted lines in Fig. 4. After sufficient air pressure has been created in the tank by the operation of the pump, the pump is removed and the screw valve 85 is screwed down firmly to its seat so as to insure against the escape of air which might result from leakage of the ball check valve 84. Under the influence of the air pressure, and with the valve 40 open, the fuel may flow through the tube 75, port 76, outlet opening 68, port 16, passageway 26, pipe 25, the bore 37 of the fitting 28, port 38, through the vaporizer or generator, and thence—properly vaporized in the manner presently to appear, and with the needle valve 46 of the vaporizer open—through the elbow 53 and pipe 52 to the burner 50, and when the valve 56 is opened, to the burner 51.

Preparatory to lighting the stove, and with the valves 40 and 46 closed, the retort 36 is heated by playing thereon the flame of a suitable torch (or by the employment of other approved preheating means) and as soon as the retort is sufficiently hot to vaporize the fuel, the valves 40 and 46 are opened. This allows the fuel to flow under the influence of the air pressure in the reservoir through the course above described, the fuel being vaporized in the retort and issuing therefrom into the elbow 53 where it is mixed with the air that is drawn in through the branch 54. The mixture then flows through the pipe 52 to the burner 50 and is lighted as it issues from the openings thereof. The flame of the burner is controlled by the valve 46, as will be readily understood, and said flame serves to maintain the vaporizer hot during the continued operation of the stove. To light the burner 51 it is only necessary to open the valve 56 by means of the handle 57 and apply a light to the burner; and to compensate for the gas of which the burner 50 is robbed by the opening of the valve 56, the valve 46 of the retort may be opened further.

As the quantity of liquid fuel in the reservoir is depleted by the continued operation of either or both of the burners additional air may be introduced into the reservoir by opening the screw valve 85 and using the air pump 90 as above described.

When it becomes necessary to replenish the fuel supply, the screw 81 is retracted sufficiently to allow the member 66 to be disengaged from the boss 14 and lifted clear of the proturberance 92 of the valve 17. Immediately upon the initial retraction of the screw 81, the fluid tight joint between its lower tapered end and the tapered seat 80 of the cap 78 is broken and the air pressure within the reservoir is released. With the reservoir disconnected from the stove as explained, it can be carried, as by means of its handle 95, to a convenient place for refilling.

In considering the remaining forms of the invention herein disclosed, it will be understood that they are incorporated in a stove structure like that above described, the end panel, and the fuel pipe which has connection with the reservoir supporting unit, being designated, throughout the several views, 3 and 25, respectively.

Figure 7:
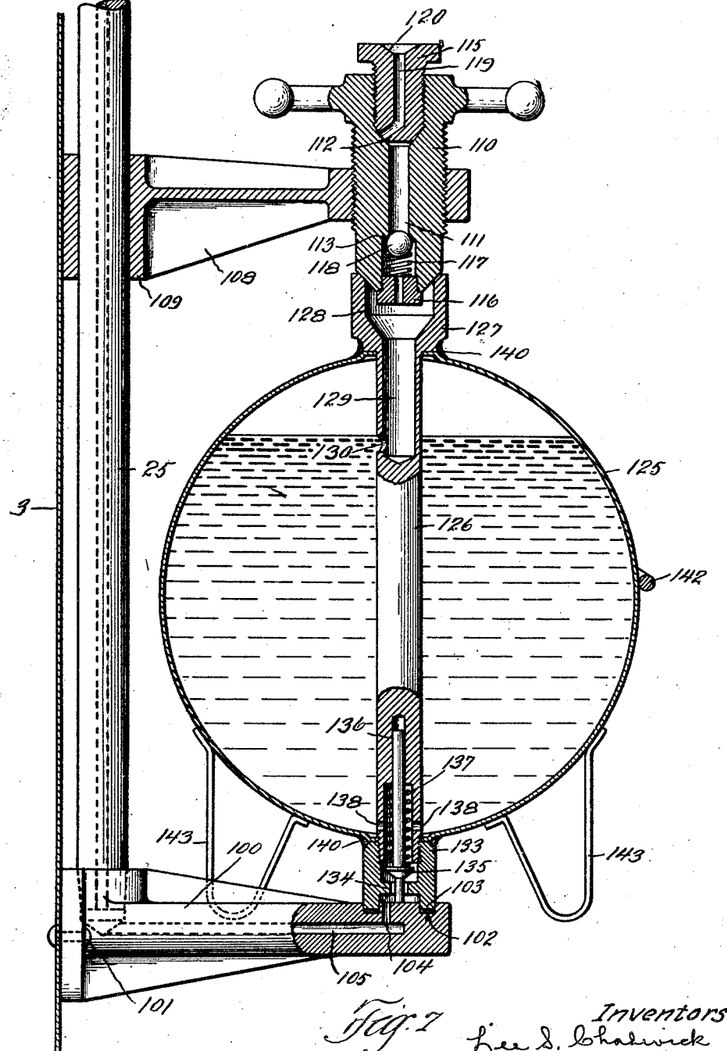
Fig. 7 is a vertical sectional view, similar to Fig. 4, of a modification of the invention.

In the modification illustrated in Fig. 7, a unit 100 is applied to the lower end of the pipe 25 and is connected by fastening means 101 to the end panel 3. Within the top surface of the outer end of the unit 100 is formed an annular depressed seat 102 to which is applied a washer 103 of suitable packing material and a port 104 opens through the top face of the portion of the unit surrounded by the seat 102, said port being arranged off center with respect to said seat. This port communicates, through a passageway 105, with the bore of the pipe 25.

Spaced a suitable distance above the unit 100 is an arm 108 which is attached to and extends from the end panel 3 in alignment with the unit 100, and the same is shown as having a portion 109 that surrounds the pipe 25 thereby to hold the arm rigid and in fixed relation to the unit 100. Threaded through the outer end of the arm 108 is a screw 110 having a bore 111 whose upper and lower ends join, through the respective tapered seats 112 and 113, enlarged bores, the upper one being threaded for the reception of a screw valve 115, while the lower one is designed to receive the hollow threaded screw 116 which supports, through a spring 117, a ball check valve 118 that cooperates with the tapered seat 113. The lower end of the screw valve 115 is tapered to mate with the seat 112 and said valve has a port 119 that opens through its tapered end, and through its upper end where it is surrounded by a depression 120 for the application of an air pump.

A fuel reservoir is designated 125, and extending diametrically through the same from top to bottom is a post 126. This post has a head 127 that is provided with a recess 128 that communicates with the interior of the reservoir through a bore 129 and a port 130. The top surface of the head 127, surrounding the recess 128, is tapered for cooperation with the tapered lower end of the screw 110. The lower end of the post 126, where it protrudes beyond the bottom wall of the reservoir 125, is threaded for the application of a tubular member 133 having intermediate its ends a transverse partition provided with a passageway 134 that is adapted to be closed by a valve 135. The lower end of the post is bored to provide a guide for the stem 136 of the valve 135, and counterbored for the accommodation of a spring 137 that surrounds the valve stem and is compressed between the valve body and the end wall of the counterbore. Communication between the interior of the tubular member 133 and the interior of the reservoir 125 is established through ports 138 that open into the counterbore of the post. The lower end of the member 133 is designed for cooperation with the packing washer 103 on the seat 102 thereby to effect a liquid tight joint between the member and unit 100 when the screw 110 is drawn down firmly against the head 127. The joints between the reservoir and the head 127 on the one hand and the member 133 on the other are sealed by deposits 140 of solder or the like. The reservoir is provided with a bail 142 and with legs 143.

With the reservoir connected to the stove as above described, air may be introduced into the reservoir by retracting the screw valve 115, applying an air pump to the depression 120 thereof and operating the pump, the ball check valve 118 permitting the entrance but preventing the egress of air through the bore 111 of the screw 110. When the required air pressure has been created within the reservoir the pump is removed and the screw valve is turned down on its seat to positively preclude the escape of air from the reservoir.

When it is desired to remove the reservoir for filling purposes, the screw 111 is relaxed to permit the escape of air between its lower end and the head 127 and is retracted sufficiently to allow the reservoir to be lifted thereby to disengage the member 133 from the unit 100 when, by means of the bail 142, the reservoir may be carried away for refilling. As soon as the reservoir is lifted from the unit 100, the valve 133 will descend to close the port 134 and prevent leakage of any liquid fuel that may remain in the reservoir.

In the form of the invention illustrated in Figs. 8 to 11, a unit 150 is secured to the end panel 3 as by fastening means 151 and the fuel pipe 25 is connected to the inner end of said unit in communication with a passageway 152. The outer end of the unit has an upstanding cylindrical flange 153 that is provided with diametrically opposed slots 154 that open through the top of the flange, as best illustrated in the developed sectional detail of Fig. 11. Rising from the unit in concentric relation to the flange 153 is a boss 155 that has formed in its top surface a socket 156 that is other than circular in plan—preferably square; and surrounding the boss 155 is a depressed annular seat 157 to which is applied a washer 158 of suitable packing material. The before mentioned passageway 152 opens into the socket 156.

Figure 8:
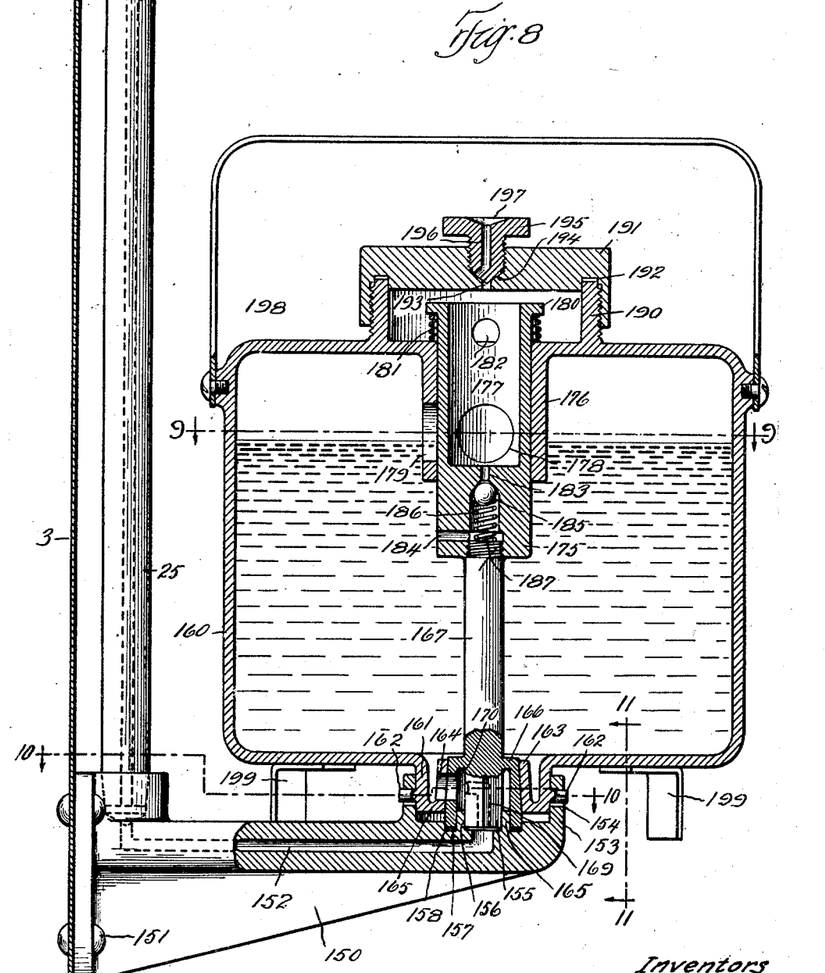
Fig. 8 is a similar view of a further modification.
Figure 9:
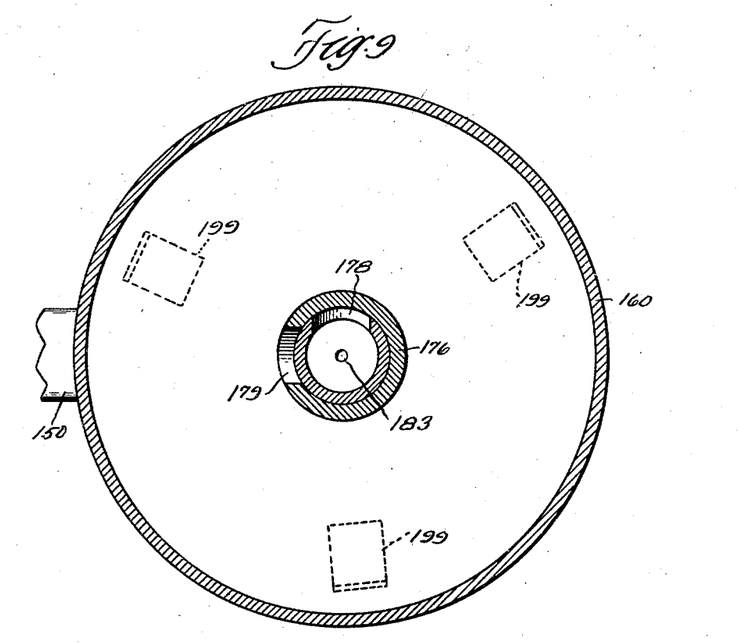
Figs. 9, 10 and 11 are sections on the respective, correspondingly numbered lines of Fig. 8, Fig. 11 being in the nature of a development.
Figure 10:
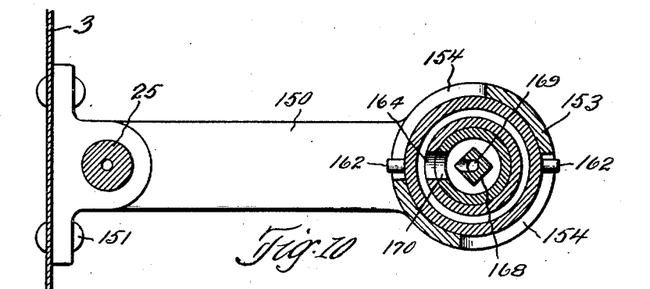
Figure 11:
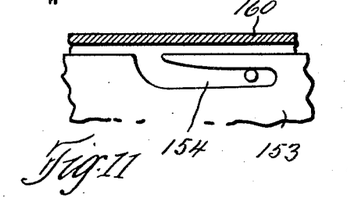

The fuel tank or reservoir 160 that is designed for use in the present embodiment is cylindrical with its axis vertical and its bottom wall is provided with a central cylindrical extension 161 that is of a size to enter the upstanding cylindrical flange 153 of the unit 150. Pins 162 project from diametrically opposed parts of the extension 161 and are adapted to be engaged within the slots 154, thereby to effect a bayonet joint connection between the reservoir and the supporting unit 150. Spaced inwardly from and arranged in concentric relation to the extension 161 is a wall 163 having a port 164, the outer ends of said extension and wall being connected together by an annular wall 165. The inner surface of the wall 163 converges upwardly and cooperating therewith is a correspondingly tapered hollow valve body 166 that is formed on the lower end of a stem 167. A shank 168 constitutes, in effect, an extension of the stem 167 and is located centrally of the valve body 166 and is designed to fit the socket 155 the same, in the present instance, being square in cross section. An L-shaped passageway 169 opens through the end of the shank 168 and through the side thereof into the interior of the hollow valve body 166, incidentally opposite a port 170 in the valve body that is adapted, under certain circumstances, to be brought into register with the above mentioned port 164.

Suitably secured, as by screw connection, with the upper end of the stem 167 is a cylindrical valve body 175 that operates within a sleeve 176 depending from the top wall of the reservoir. The valve body 175 has a chamber 177 that extends a suitable distance downwardly from the upper end of said body, and an opening 178 in the cylindrical wall of the chamber 177 is adapted to register, under certain conditions, with an opening 179 in the sleeve 176. The valve body 175 extends somewhat above the top wall of the reservoir and is provided with an outwardly extending flange 180 between which and said wall a spring 181 is compressed. This spring tends to elevate the valve body 175 and, through the stem 167, the valve body 166 thereby to retain the latter firmly seated against the tapered surface of the wall 163. A hole 182 is formed in the wall of the chamber 177 at about the level of the top wall of the reservoir for a purpose which will presently appear. An air passageway between the chamber 177 and the interior of the reservoir is provided by ports 183 and 184 the former being controlled by a ball check valve 185 that is moved to closed position by a spring 186 that is confined between the ball and the upper end of the stem 167 where the latter is screwed into a cavity 187 that accommodates said ball and spring.

Rising from the top wall of the reservoir about the exposed end of the valve body 175 is an externally threaded neck 190 to which is applied a cap 191 that is fitted with a packing washer 192 for cooperation with the end of the neck. The cap has a central hole 193 that joins, through a tapered seat 194, an internally threaded socket for the reception of a screw valve 195, said valve being provided with a port 196 that opens at its lower end through the tapered end of the valve and at its upper end into a depression 197 for the application of an air pump. A bail 198 is suitably connected at its ends to diametrically opposed parts of the reservoir, while legs 199 depend from the bottom of the reservoir.

With the parts in the positions shown in the drawing, it is evident that air may be introduced into the reservoir by retracting the screw valve 195, applying a pump to the depression 197 thereof, and operating the pump to force air into the reservoir through the ports 183 and 184, the ball check valve 185 permitting the entrance but preventing appreciable escape of the air. After the reservoir has been properly charged with air pressure, the screw valve 195 is closed to positively hold the air. It is further evident that the liquid fuel, under air pressure, may flow through the ports 164 and 170, passageways 169 and 152 to and through the pipe 25 to the burners.

When it is desired to remove the reservoir, the bail 198 is grasped and the reservoir is turned so as to bring the pins 162 adjacent the open ends of the slots 154. During this turning of the reservoir, the assembly involving the valve bodies 166 and 175 is held against rotation by reason of the engagement of the shank 168 within the socket 156. As a result of this turning of the reservoir with respect to the valve bodies, the port 164 will be moved away from the port 170, thereby to close the fuel outlet of the reservoir, and the opening 179 will be moved into register with the opening 178 of the valve body 175. The reservoir may now be lifted from the supporting unit 150 without danger of the escape of any liquid fuel that may remain within the reservoir and the reservoir carried to a convenient place for filling. To fill the reservoir the cap 191 is removed from the neck 190 and the fuel is poured into the chamber 177 from whence it flows through the openings 178 and 179 into the reservoir. Any fuel poured within the neck 190 and outwardly beyond the valve body 175 will flow through the opening 182 into the chamber 177 and thence to the reservoir.

Figure 12:
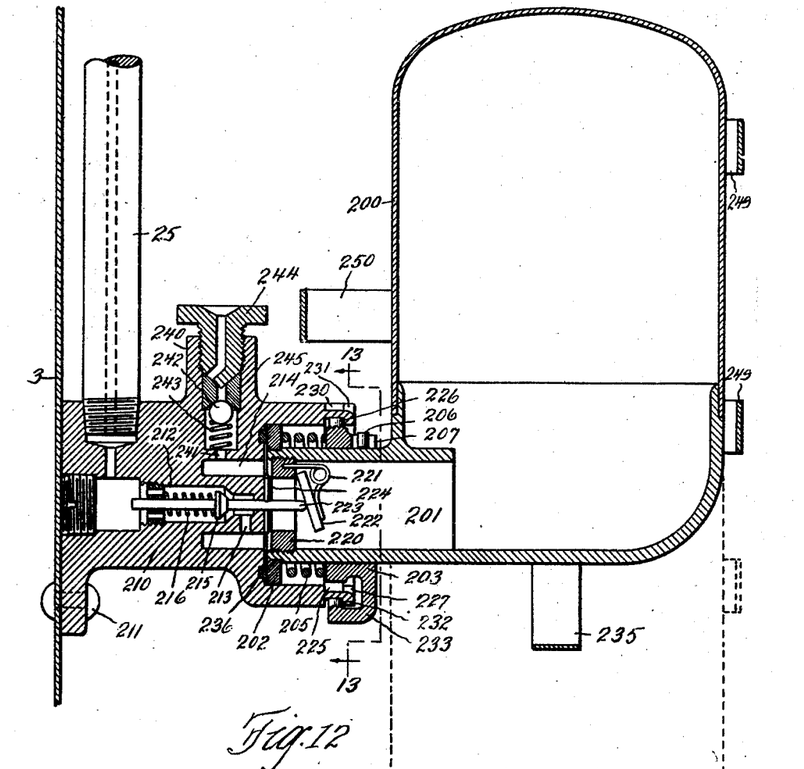
Fig. 12 is a central vertical section through another form of the invention.
Figure 13:
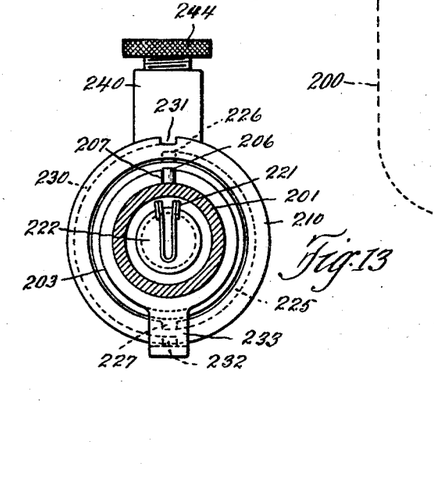
Fig. 13 is a section on the line 13—13 of Fig. 12.

The reservoir 200 of the modification of the invention illustrated in Figs. 12 and 13 has a neck 201 that extends laterally from one of its ends, and the outer end of said neck is surrounded by a flange 202 between which, and a member 203, that loosely encircles the neck, is compressed a spring 205. While the member 203 is permitted to move axially of the neck, it is held against turning with respect thereto by a pin 206 that extends from the neck and occupies a notch 207 in said member. With the tank occupying the position indicated in dotted lines in Fig. 12, the neck 201 is adapted to be projected into the hollow cylindrical end of a unit 210 that is secured, as by fastening means 211, to the end panel 3, said unit having a passageway 212 that communicates with the fuel pipe 25 that is connected to the inner end of said unit. The passageway 212 opens at its outer end through a lateral port 213 into an annular chamber 214 which constitutes, in effect, in the present embodiment, the receiving end of the fuel conduit that ultimately leads to the burners. The port 213 is controlled by a valve 215 that is adapted to be seated by a spring 216. Screwed into the end of the neck 201 is a ring 220 that carries, through a spring 221, a flap valve 222. The stem 223 of the valve 215 is adapted to project into the neck 201 sufficiently to unseat the flap valve 222 when the reservoir is in place, and a cross pin 224 that extends through the valve stem 223 is arranged to engage the ring 222 and unseat the valve 215.

Formed on the inner face of the cylindrical outer end of the unit 210 is a circumferential groove 225 within which a pin 226 on the member 203 is adapted to operate, the pin entering said groove through a slot 227 that opens through the end of the unit on the bottom side thereof. A similar groove 230 is formed on the outer surface of the unit and at one end opens, through a slot 231, through the outer end of the unit at a point diametrically opposite the previously mentioned slot 227, and a pin 232 that is carried by an overhanging arm 233 of the member 203 is adapted to operate within the groove 230, entering the same through the slot 231. Each of the grooves 225 and 230 extends substantially half way around the unit.

When applying the reservoir to the stove it is held suspended by a handle 235 that is applied to one end of the reservoir and in this position the pin 232 may be presented to the slot 231 while the pin 226 is in a position to enter slot 227. As the neck 201 is projected into the hollow cylindrical end of the unit 210 for engagement with a gasket 236 that occupies a groove in the annular wall surrounding the chamber 214, the aforesaid pins enter their respective slots and, when the reservoir is inverted to full line position, said pins travel about the grooves 225 and 230 thereby to secure the reservoir to the supporting unit. The spring 205 tends to urge the neck of the reservoir inwardly into firm contact with the gasket 236 thereby to effect a liquid tight seal between the reservoir and the unit 210. During the application of the reservoir, the valves 215 and 222 are opened as above explained.

Thus it will be seen that in this as in the immediately preceding form of the invention the reservoir is attached to the fuel conduit through a so-called bayonet-joint connection.

In the present instance, air is admitted to the reservoir through a hollow boss 240 of the unit 210, the interior of which boss communicates, through a port 241, with the annular chamber 214. The boss accommodates a ball check valve 242 with its spring 243, and a screw valve 244, both valves cooperating with tapered seats formed on opposite sides of a tubular member 245 that occupies the bore of the boss.

The end of the reservoir opposite the handle 235 is preferably rounded so that the reservoir cannot be stood on end, while its side opposite that from which the neck 201 projects may be provided with legs 249 on which the reservoir may be stood when filling it, the reservoir being adapted to be carried in this position by means of a handle 250.

Having thus described our invention, what we claim is:—

1. In a liquid fuel stove of the class described, the combination of a fuel conduit leading to the burner, said conduit terminating at its receiving end in a seat that surrounds said end, a fuel reservoir normally requiring detachment from the stove for filling, and having an outlet for application to said seat, means urging the reservoir toward the conduit thereby to effect a fluid tight joint between the outlet of the reservoir and the seat, and means for introducing air under pressure into the reservoir.

2. In a liquid fuel stove of the class described, the combination of a fuel conduit leading to the burner, said conduit terminating at its receiving end in a seat that surrounds said end, a fuel reservoir normally requiring detachment from the stove for filling, and having an outlet for application to said seat, means for urging the reservoir toward the conduit thereby to effect a liquid tight joint between the outlet of the reservoir and the seat, a valve for closing the outlet of the reservoir and which assumes closed position upon the removal of the reservoir and the consequential withdrawal of its outlet from the seat, and provisions for introducing air under pressure into the reservoir.

3. In a liquid fuel stove of the class described, the combination of a fuel conduit leading to the burner, a fuel reservoir normally requiring detachment from the stove for filling and having a filling opening and also an outlet, the latter being arranged for application to the receiving end of the conduit, means urging the reservoir toward the conduit thereby to effect a fluid tight joint between the outlet of the reservoir and the receiving end of the conduit, and means for introducing air under pressure into the reservoir.

4. In a liquid fuel stove of the class described, the combination of a fuel conduit leading to the burner, a fuel reservoir normally requiring detachment from the stove for filling and having an outlet for application to the receiving end of the conduit, means for urging the reservoir toward the conduit thereby to effect a liquid tight joint between the outlet of the reservoir and the receiving end of the conduit, a valve for closing the outlet of the reservoir and which assumes closed position upon the removal of the reservoir from the conduit, means for introducing air under pressure into the reservoir, and means for releasing the air before the reservoir can be removed from the conduit.

5. In a liquid fuel stove of the class described, the combination of a fuel conduit leading to the burner, a fuel reservoir normally requiring detachment from the stove for filling, and having a fuel outlet for application to the receiving end of the conduit, the reservoir having also a filling connection, and means cooperating with the filling connection for securing the reservoir in place with its outlet communicating with the fuel conduit, said means serving when in effective position to prevent filling of the reservoir.

6. In a liquid fuel stove of the class described, the combination of a fuel conduit leading to the burner, a part in opposed and fixed relation to the receiving end of the fuel conduit, a fuel reservoir normally requiring detachment from the stove for filling, and having a filling opening and an outlet, the latter being arranged for application to the receiving end of the conduit, and a member carried by the aforesaid part for clamping the reservoir in place with its outlet in liquid tight connection with the fuel conduit, said member when in effective position serving to maintain the filling opening of the reservoir closed.

7. In a liquid fuel stove of the class described, the combination of a fuel conduit leading to the burner, a fuel reservoir normally requiring detachment from the stove for filling, and having a fuel outlet for application to the receiving end of the conduit, the reservoir having a filling connection, means cooperating with the filling connection for sealing the same and securing the reservoir in place with its outlet in fluid tight communicative connection with the fuel conduit, and means for introducing air under pressure into the reservoir, the former means upon initial operation for releasing the reservoir allowing the escape of air from the reservoir.

8. In a liquid fuel stove of the class described, the combination of a fuel conduit leading to the burner, a part in opposed and fixed relation to the receiving end of the fuel conduit, a fuel reservoir normally requiring detachment from the stove for filling, and having a filling opening and an outlet, the latter being arranged for application to the receiving end of the conduit, a member movably carried by the aforesaid part for sealing the filling opening and clamping the reservoir in place with its outlet in fluid tight connection with the fuel conduit, and means for introducing air under pressure into the reservoir, the aforesaid member upon initial movement for releasing the reservoir allowing the escape of air from the reservoir.

9. In a liquid fuel stove of the class described, the combination of a fuel conduit leading to the burner, a part in opposed and fixed relation to the receiving end of the fuel conduit, a fuel reservoir normally requiring detachment from the stove for filling, and having a filling opening and an outlet, the latter being arranged for application to the receiving end of the conduit, a member carried by the aforesaid part for clamping the reservoir in place with its outlet in liquid tight connection with the fuel conduit, said member when in effective position serving to maintain the filling opening of the reservoir closed, and a valve for closing the outlet of the reservoir when the reservoir is disconnected from the conduit.

10. In a liquid fuel stove of the class described, the combination of a fuel conduit leading to the burner, a part in opposed and fixed relation to the receiving end of the fuel conduit, a fuel reservoir normally requiring detachment from the stove for filling, and having a filling opening and an outlet, the latter being arranged for application to the receiving end of the conduit, a member carried by the aforesaid part for clamping the reservoir in place with its outlet in liquid tight connection with the fuel conduit, said member when in effective position serving to maintain the filling opening of the reservoir closed, a valve for closing the outlet of the reservoir when the latter is disconnected from the conduit, and a valve for closing the receiving end of the conduit, the latter valve being unseated by the former valve when the reservoir is applied to the conduit.

11. In a liquid fuel stove of the class described, the combination of a frame structure having opposed reservoir supporting parts, a burner, a liquid fuel conduit leading to the burner and opening at its receiving end through one of said supporting parts, a reservoir having a filling opening and an outlet, the latter being arranged for application to the receiving end of the conduit, and means carried by the other of said opposed parts for clamping the reservoir in place with its outlet opening in communication with the conduit.

12. In a liquid fuel stove of the class described, the combination of a frame structure having opposed reservoir supporting parts, a burner, a liquid fuel conduit leading to the burner and opening at its receiving end through one of said supporting parts, a reservoir having a filling opening and an outlet, the latter being arranged for application to the receiving end of the conduit, and means carried by the other of said opposed parts for clamping the reservoir in place with its outlet opening in communication with the conduit, said means serving when in effective position to prevent access to the filling opening of the reservoir.

13. In a liquid fuel stove of the class described, the combination of a frame structure having opposed reservoir supporting parts, a burner, a liquid fuel conduit leading to the burner and opening at its receiving end through one of said supporting parts, a reservoir having a filling opening and an outlet, the latter being arranged for application to the receiving end of the conduit, and a member having screw threaded connection with the other of said opposed parts for clamping the reservoir in place with its outlet opening in communication with the conduit, said member when in effective position serving to prevent access to the filling opening of the reservoir.

14. In a liquid fuel stove of the class described, the combination of a frame structure having opposed reservoir supporting parts, a burner, a liquid fuel conduit leading to the burner and opening at its receiving end through one of said supporting parts, a reservoir having a filling opening and an outlet, the latter being arranged for application to the receiving end of the conduit, means carried by the other of said opposed parts for sealing the filling opening and clamping the reservoir in place with its outlet opening in communication with the conduit, and means for introducing air under pressure into the reservoir, the former means permitting the escape of air from the reservoir upon intial actuation to release the reservoir.

15. In a liquid fuel stove of the class described, the combination of a frame structure having opposed reservoir supporting parts, a burner, a liquid fuel conduit leading to the burner and opening at its receiving end through one of said supporting parts, a reservoir having a filling opening and an outlet, the latter being arranged for application to the receiving end of the conduit, a member having screw thread connection with the other of said opposed parts for clamping the reservoir in place with its outlet opening in communication with the conduit, said member when in effective position serving to seal the filling opening of the reservoir, and means for introducing air under pressure into the reservoir.

16. In a liquid fuel stove of the class described, the combination of a frame structure having opposed reservoir supporting parts, a burner, a liquid fuel conduit leading to the burner and opening at its receiving end through one of said supporting parts, a reservoir having a filling opening and an outlet, the latter being arranged for application to the receiving end of the conduit, and a member having screw thread connection with the other of said opposed parts for clamping the reservoir in place with its outlet opening in communication with the conduit, said member when in effective position serving to prevent access to the filling opening of the reservoir, said member having a port communicating with the reservoir and equipped for the application of an air pump whereby air may be introduced into the reservoir through said port, and a valve for closing said port.

17. In a liquid fuel stove of the class described, the combination with a frame structure having opposed reservoir supporting parts, of a burner, a liquid fuel conduit leading to the burner and opening at its receiving end through one of said supporting parts, a reservoir having a filling opening and an outlet, the latter being arranged for application to the receiving end of the conduit, a cap for closing the filling opening of the reservoir, and means carried by the other of said supporting parts for cooperation with said cap for clamping the reservoir in place with its outlet opening in communication with the conduit.

18. In a liquid fuel stove of the class described, the combination with a frame structure having opposed reservoir supporting parts, of a burner, a liquid fuel conduit leading to the burner and opening at its receiving end through one of said supporting parts, a reservoir having a filling opening and an outlet, the latter being arranged for application to the receiving end of the conduit, a cap for closing the filling opening of the reservoir, and means carried by the other of said supporting parts for cooperation with said cap for clamping the reservoir in place with its outlet opening in communication with the conduit, the means and cap having communicating ports leading to the interior of the reservoir, the means being equipped for the application of an air pump whereby air may be introduced into the reservoir through said ports, and a valve for preventing the escape of air through the ports.

19. In a liquid fuel stove of the class described, the combination of a fuel conduit leading to the burner, the inlet end of said conduit being surrounded by a seat, a fuel reservoir having an outlet for application to said seat, and a bayonet joint connection for attaching the reservoir to the conduit and acting to urge the outlet of the reservoir against said seat with a fluid tight joint, and provisions for introducing air under pressure into the reservoir.

20. In a liquid fuel stove of the class described, the combination of a fuel conduit leading to the burner, the inlet end of said conduit being surrounded by a seat, a fuel reservoir having an outlet for application to said seat, a bayonet joint connection for detachably connecting the reservoir to the conduit and acting to urge the outlet of the reservoir against said seat with a fluid tight joint, provisions for introducing air under pressure into the reservoir, and a valve for closing the outlet of the reservoir which assumes closed position upon the removal of the reservoir from the conduit.

21. In a liquid fuel stove of the class described, the combination with a fuel conduit leading to the burner, the inlet end of the conduit being surrounded by a seat, a fuel reservoir having an outlet arranged for application to said seat, the reservoir and conduit having, on the one hand, radially disposed projections and, on the other, segmental slots wherein said projections are adapted to operate to effect a connection between the reservoir and the conduit with the outlet of the former in fluid tight engagement with said seat, and provisions for introducing air under pressure into the reservoir.

22. In a liquid fuel stove of the class described, the combination of a fuel conduit leading to the burner, the inlet end of said conduit being surrounded by a seat, a fuel reservoir having an outlet arranged for application to said seat, the reservoir being adapted to be applied to the conduit and given a partial rotation with respect thereto, means rendered effective by said partial rotation of the reservoir for effecting connection between the reservoir and the conduit and for urging the outlet of the reservoir into fluid tight connection with said seat, and provisions for introducing air under pressure into the reservoir.

23. In a liquid fuel stove of the class described, the combination of a fuel conduit leading to the burner, a fuel reservoir having a filling opening and also an outlet, the latter being arranged for application to the receiving end of the conduit, the reservoir being adapted to be applied to the conduit and given a partial rotation with respect thereto, means rendered effective by said partial rotation of the reservoir for connecting the reservoir to the conduit with the outlet of the former communicating with the receiving end of the latter, and a valve for closing the outlet of the reservoir and which is moved to closed position by rotation of the reservoir in a direction to disconnect it from the conduit.

24. In a liquid fuel stove of the class described, the combination of a fuel conduit leading to the burner, a fuel reservoir having a filling opening and an outlet, the latter being arranged for application to the receiving end of the conduit, the reservoir being adapted to be applied to the conduit and given a partial rotation with respect thereto, means rendered effective by said partial rotation of the reservoir for connecting the reservoir to the conduit with the outlet of the former communicating with the receiving end of the latter, and valves for closing, respectively, the filling opening and outlet of the reservoir and which valves are operated by the rotation of the reservoir when attaching it to and removing it from the conduit.

25. In a liquid fuel stove of the class described, the combination of a fuel conduit leading to the burner, a fuel reservoir having a filling opening and an outlet, the latter being arranged for application to the receiving end of the conduit, the reservoir being adapted to be applied to the conduit and given a partial rotation with respect thereto, means rendered effective by said partial rotation of the reservoir for connecting the reservoir to the conduit with the outlet of the former communicating with the receiving end of the latter, and valves operatively connected together for controlling the filling opening and outlet of the reservoir, the valves and said conduit having cooperating parts which assume driving connection with each other upon the application of the reservoir to the conduit and through which the valves are actuated by the rotation of the reservoir with respect to the conduit, said valves serving to close the outlet and open the filling opening when the reservoir is disconnected from the conduit and vice versa.

In testimony whereof we hereunto affix our signatures.

LEE S. CHADWICK.
MARC RESEK.